United States Patent

[11] 3,632,897

[72] Inventor Itsuki Ban
829 Higashi-Oilumimachi, Nirin-ku,
Tokyo-to, Japan

[21] Appl. No. 881,139
[22] Filed Dec. 1, 1969
[45] Patented Jan. 4, 1972
[32] Priorities Dec. 2, 1968
[33] Japan
[31] 43/87618;
Dec. 4, 1968, Japan, No. 43/88370

[54] TAPE CARTRIDGE SHIFTING APPARATUS
5 Claims, 5 Drawing Figs.

[52] U.S. Cl. .................................................... 179/100.2 Z, 274/4 B, 274/11 B
[51] Int. Cl. ........................................................ G11b 15/06
[50] Field of Search ............................................ 179/100.2 Z; 274/4 B, 4 F, 4 G, 11 B

[56] References Cited

UNITED STATES PATENTS

| | | | |
|---|---|---|---|
| 3,492,005 | 1/1970 | Ueno et al. .................... | 179/100.2 Z |
| 3,083,269 | 3/1963 | Gaubert ........................ | 179/100.2 Z |

*Primary Examiner*—Stanley M. Urynowicz, Jr.
*Assistant Examiner*—J. Russell Goudeau
*Attorney*—Jacobs & Jacobs

ABSTRACT: A tape cartridge shifting apparatus for an endless magnetic tape cartridge player, comprising lever means movably provided on a deck in the player housing and engageable with the front edge of the tape cartridge located in the playing position, lever driving means for moving the lever means, an electromagnetic device for actuating operation of the lever driving means, and a control circuit energizing the electromagnetic device in relation to detection of an end mark of conductive foil provided on the tape or the nonrecorded zone between the recorded zones on the tape. The tape cartridge is shifted from the playing position to the nonplaying position by movement of the lever means by means of the lever driving means.

TAPE CARTRIDGE SHIFTING APPARATUS

BACKGROUND OF THE INVENTION

This invention relates to an endless magnetic tape cartridge player, and more particularly to a novel tape cartridge shifting apparatus for shifting to the nonplaying position an endless magnetic tape cartridge in the playing position within the player.

In a conventional endless magnetic tape cartridge player, the tape cartridge is manually shifted from the playing position to the nonplaying position and, simultaneously with movement with movement of the tape cartridge to the nonplaying position, the running of the endless magnetic tape within the tape cartridge is stopped. Accordingly, if the tape cartridge is withdrawn in the middle of a recorded selection, then when the cartridge is reinserted, the reproduction will start in the middle of the musical performance. Preferably, reproduction is made at the beginning of the musical performance recorded in the tape when playing the tape cartridge. However, as long as the tape cartridge player is manually shifted from the playing position to the nonplaying position to stop the play of the tape cartridge, it is inevitable that reproduction will begin in the middle of the musical performance when playing the tape cartridge once again.

The inventor has succeeded in obtaining an apparatus for automatically shifting the tape cartridge from the "play" position to the "nonplay" position in relation to detection of an end mark on the tape or a nonrecorded zone on the tape. By addition of such apparatus to the tape player, the cartridge, when reinserted into the player, will always begin the reproduction at the starting position of the tape or of the musical performance.

SUMMARY OF THE INVENTION

It is a primary object of the invention to provide a tape cartridge shifting apparatus for an endless magnetic tape player, automatically shifting to the nonplaying position a tape cartridge located in the playing position in relation to detection of an end mark or nonrecorded zone on the endless magnetic tape.

Another object of the invention is to provide a tape cartridge shifting apparatus for an endless magnetic tape player, comprising a movably provided lever means capable of engaging the front edge of the tape cartridge whereby the tape cartridge is shifted from the playing position to the nonplaying position.

A further object of the invention is to provide a tape cartridge shifting apparatus for an endless magnetic tape player wherein driving means for moving the lever means initiates its operation in relation to operation of an electromagnetic device energized in response to the output of detecting means detecting an end mark or the nonrecorded zone on the endless magnetic tape.

Still further object of the invention is to provide a tape cartridge shifting apparatus for an endless magnetic tape player wherein a drive source for the driving means is a rotary capstan for drivingly running the magnetic tape within the tape cartridge.

Other object and advantages will become apparent from the following description of an exemplary embodiment of the invention illustrated in the drawings, in which:

DESCRIPTION OF THE PREFERRED EMBODIMENTS

Figure 1:
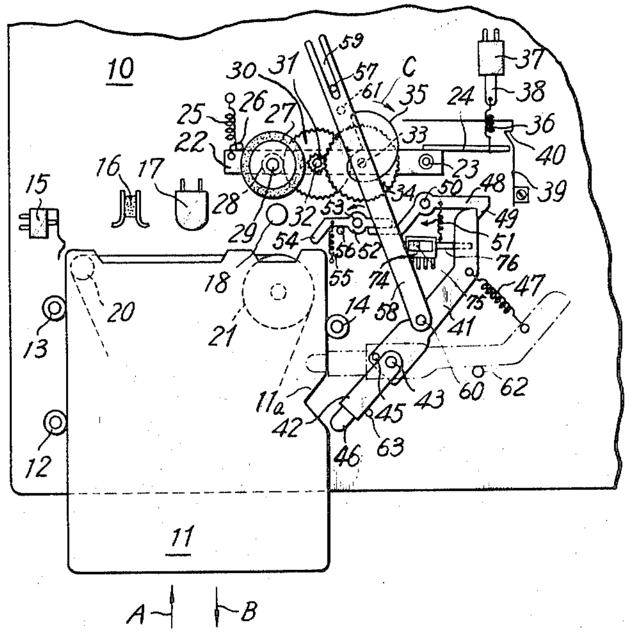
FIG. 1 is a representation schematically showing one embodiment of a tape cartridge shifting apparatus according to the present invention.

In FIG. 1, numeral 10 is a horizontal deck which is provided within a housing (not shown) for an endless magnetic tape cartridge player and on which is mounted the endless magnetic tape cartridge 11 inserted for play into an opening (not shown) formed in the housing, and a tape cartridge shifting apparatus, as will be detailed later, according to the invention. Much of the mechanism disposed beneath the deck 10 is omitted since it forms no part of the present invention. However, shown on the deck 10 are guides 12 to 14 for the cartridge 11, a door switch 15 actuated by the cartridge 11, an end mark detection or search means 16, a magnetic head 17, and a rotational capstan 18. As will later be described, the capstan 10 is adapted to be rotatably driven by an electrical motor (not shown) which is energized in relation to the closing of the door switch 15.

The tape cartridge 11 includes a generally rectangular housing with a centrally disposed reel assembly (not shown) on which an endless magnetic tape 19 is wound and unwound in conventional manner. The endless tape 19 passes over a guide 20 and a pinch roller 21. The guide 20 and the pinch roller 21 are disposed adjacent the leading edge of the cartridge whereat the cartridge sidewall is cut away or disposed with and the tape 19 is extended from the center of the hub of the reel (not shown) about the guide 20 and thence about the pinch roller 21 back to the outer periphery of a roll formed by the tape wound about the hub.

The tape cartridge shifting apparatus according to the present invention includes a swing lever 22 swingably mounted by a sleeve on a shaft 23 on the deck 10. The swing lever 22 is provided at an end portion thereof with a leaf spring 24 and is urged in the clockwise direction by a tension spring 25 but inward movement of the swing lever is limited by a stopper pin 26 on the deck 10. A rubber covered frictional wheel 27 and a gear 28 connected to each other are rotatably supported on an axis 29 on the swing lever 22. The frictional wheel 27 as will be described later is caused to abut against the capstan 18 by rotation of the swing lever 22 from the position as shown to the counterclockwise direction and is rotatably driven by the capstan 18. Integrally formed gears 30 and 31 are rotatably supported on an axis 32 on the swing lever 22. The gear 30 is adapted to mesh with the gear 28. Rotatably mounted on an axis 33 on the swing lever 22 are a gear 34 and a cam 35 which are connected with each other, with the gear 34 meshing with the gear 31. The gears 28, 30, 31, and 34 constitute a reduction gearing and rotation of the frictional wheel 27 is reduced to be imparted to the cam 35. A spring 36 is stretched between the leaf spring 24 and an actuator 38 of an electromagnetic plunger 37. When a pulse of current is supplied to the plunger 37, the swing lever 22 is rotated counterclockwise against the bias of the spring 25. This causes the frictional wheel 27 to abut with the capstan 18 to initiate rotation of the cam 35. At this moment, the one end of the leaf spring 24 is engaged by a bent portion 40 integrally formed in a substantially L-shaped leaf spring 39 one end of which is mounted on the deck 10. With this arrangement, after the plunger has been deenergized, the swing lever 22 is held in its position against the bias of the spring 25 so that the cam 33 keeps rotating.

Figure 2:
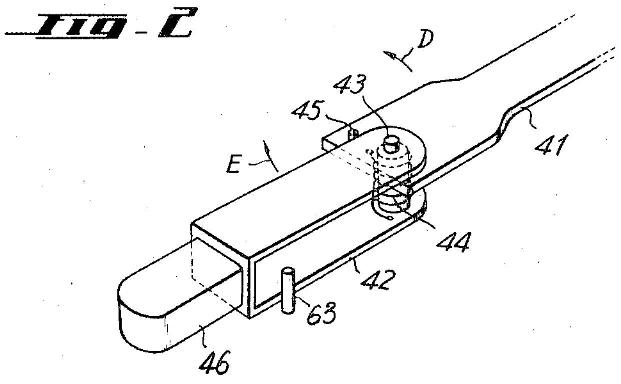
FIG. 2 is an enlarged perspective view of the arm levers shown in FIG. 1.

The apparatus for locating the tape cartridge 11 in the playing position comprises arm levers 41, 42 rotatably supported on a shaft 43 on the deck 10. As will be fully illustrated in FIG. 2, the arm lever 41 is connected by a spiral spring 44 to the substantially U-shaped arm lever 42 and they are given rotational forces in the directions of arrows D,E, respectively, and a relative position between the lever arms is constantly maintained by engaging the arm lever 42 with a pin 45 on the arm lever 41. A retension member 46, as will be described hereinafter, is rigidly mounted on the arm lever 42 at one end thereof. The arm lever 41 is clockwise biased by a tension spring 47, and rotation of the arm lever due to the spring 47 is prevented since the free end of the arm lever 41 engages a hook portion 49 integrally formed in a latch lever 48 pivoted at the point 50 on the deck 10. The latch lever 48 is biased in the direction of arrow by a spring 51. The latch lever 48 engages at the other end away from the hook portion 49 one end portion of an actuator lever 52 pivoted at the point 53 on the deck 10. The actuator lever 51 is provided with an end portion 54 which is pushed by the cartridge 11 insertable into the player. The actuator lever 52 is biased in the direction of the arrow by a spring 55 but inward movement of the lever is limited by a stopper pin 56. Mounted on the deck 10 is a pin 57 which is received in a slot 59 formed in arm lever 58 pivoted at the point 60 on the arm lever 41. Provided beneath of the arm lever 58 is a pin, as will be later described, which engages the cam 35.

FIG. 1 shows the cartridge 11 partially inserted on the player. Further insertion of the cartridge allows the front end thereof to urge the end portion 54 of the actuator lever 52 whereby the lever 52 is clockwise rotated against the bias of the spring 55. Rotation of the actuator lever 52 results in that the latch lever 48 is counterclockwise rotated against the bias of the spring 51 to disengage the hook portion 49 with the arm lever 41 so that the arm levers 41 and 42 are clockwise rotated by the bias of the tension spring 47. With rotation of the arm lever 42, the retension member 46 is received in a notch 11*a* on the side of the cartridge 11 to push the cartridge in the direction of arrow A. Accordingly, the cartridge 11 is automatically moved in the direction of arrow A in accordance with rotation of the arm levers 41 and 42 while the pinch roller 21 is moved to the "play" position where it abuts against the capstan 18 over the tape 19. At this moment, the arm levers 41 and 42 are rotated to a position shown by the dot and dash line to engage the arm lever 41 with a stopper pin 62 on the deck 10. The cartridge 11 moved to the "play" position is securely maintained in this position since it is biased by the retension member 46 in the direction of arrow A, the retension member 46 being received in the notch 11*a*. The door switch 15 is actuated and closed by the cartridge 11 to energize a motor (not shown) to rotatably drive the capstan 18. As a result, the cartridge 11 is located in the playing position and the tape 19 is drivingly fed by the capstan 18 and the pinch roller 21 with abutting against the end mark detection 16 and the magnetic head 17. It will be readily understood from the following description that how is operated the tape cartridge shifting apparatus of the invention for shifting the cartridge 11 located in the "play" position to the "nonplay" position. Now, the electromagnetic plunger 37 as will be later described is energized by a control circuit shown in FIGS. 3 and 4, and the swing lever 22 is counterclockwise rotated against the bias of the spring 25 to allow the frictional wheel 27 to abut against the capstan 18 and to be rotated. Abutment of the frictional wheel 27 against the capstan 18 may be maintained even after the plunger 37 has been energized since the swing lever 22 is engaged by the bent portion 40 of the leaf spring 39 in aid of the leaf spring 24. Rotation of the frictional wheel 27 is transmitted through the reducing gearing 28, 30, 31, and 34 to the cam 35 allowing it to be rotated in the direction of arrow C. The cam 35 is in the position shown in FIG. 1 before rotated and is allowed at the minimum deformed portion thereof to be adjacent the pin 61 formed on the arm lever 58 which is moved when the arm lever 41 is moved to the position shown by the dot and dash line. The cam 35 initiates its rotation and abuts against the pin 61 to allow the arm lever 41 to be counterclockwise rotated by the arm lever 58 against the bias of the spring 47 from the position shown by the dot and dash line. By reaction derived from depression by the cam 35 upon the pin 61, the swing lever 22 is given the counterclockwise rotational force to allow the frictional wheel 27 to be forcedly urged by the capstan 18. This power transmission is ensured according to increase of the load. During rotation of the cam 35, the cam 35 could slidably abut against the end of the leaf spring 39 to press the leaf spring 39 whereby the bent portion 40 of the leaf spring 39 is moved out of engagement with the leaf spring 24 so that the swing lever 22 is urged clockwise to its normal position. On the other hand, the cam 35 abuts against the pin 61 so that the swing lever 22 will not be returned to its normal position while abutment of the frictional wheel 27 against the capstan 12 is maintained to keep rotation of the cam 35. Counterclockwise rotation of the arm levers 41, 42 permits the retention member 46 to escape from the notch 11*a* in the cartridge 11. In consequence, the cartridge 11 is moved in the direction of arrow B by the actuator lever 52 which is returned to its normal position by the bias of the spring 55 while urging the front edge of the cartridge. When the cam 35 makes about one rotation to allow the maximum deformed portion to abut against the pin 61, the arm levers 41, 42 are moved to the position shown by the solid line to engage the lever 42 with a stopper pin 63 on the deck 10 to thus stop movement of the arm levers. After a brief interval upon return of the arm levers 41, 42 to the position shown by the solid line, the actuator lever 52, latch member 48 are returned to the position as shown by the bias of the springs 55, 51 whereby the hook portion 49 of the latch lever 48 engages the end portion of the arm lever 41. Before the actuator lever 52 has been completely returned to its normal position, the maximum deformed portion of the cam 35 is away from the pin 61 to disengage the cam 35 from the pin 61. Accordingly, the swing lever 22 is clockwise rotated by the bias of the spring and then returned to its normal position. When the actuator lever 52 is completely returned to its normal position to move the cartridge 11 from the "play" position to the "nonplay" position, the door switch 15 is opened and in association therewith rotation of the capstan 18 is blocked.

Figure 3:
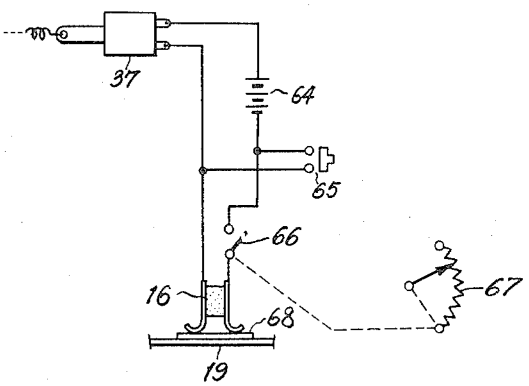
FIGS. 3 and 4 are representations schematically showing control circuits different to each other for the electromagnetic plunger in FIG. 1.

A control circuit in FIG. 3 for the electromagnetic plunger 37 comprises an electrical source 64, a push button switch 65, an electrical switch 66, and the end mark detection or search means 16. Similar numerals are used to illustrate like parts in FIG. 1.

Upon operation of the pushbutton switch 65, the plunger 37 is energized by the source 64 to initiate return of the arm levers 41, 42 and 58 as previously described. The switch 66 is incorporated in a variable resistor 67 (shown by the dotted line) for adjusting volume, which is provided in the reproducing circuit of the player. The switch 66 is adapted to be closed when the variable resistor 67 is operated to minimize volume. After the switch has been closed, volume output from the player is off while the magnetic tape 19 keeps running. If two insulated contacts of the end mark search means 16 are shorted by an end mark 68 of conductive piece formed on the tape 19, the plunger 37 is energized by the source 64. Therefore, the cartridge 11, as previously mentioned, is shifted from the "play" position to the "nonplay" position. The cartridge 11 located in the "play" position is shifted to the "nonplay" position in response to detection of the end mark 68 on the tape 19 by the mark search means 16.

Figure 4:
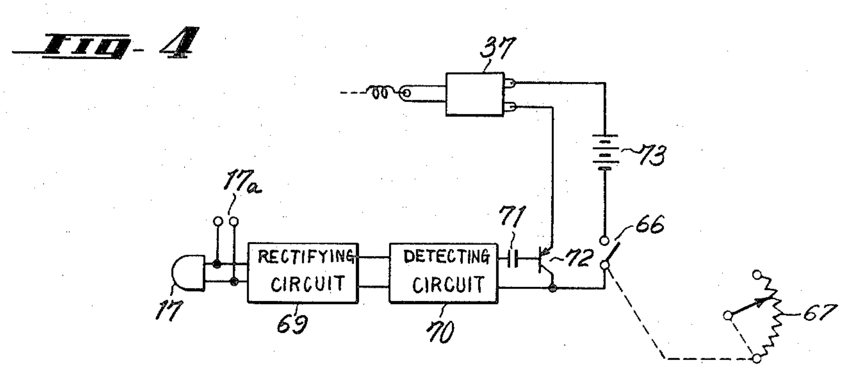

A control circuit in FIG. 4 for the electromagnetic plunger 37 is different from that shown in FIG. 3 and is capable of energizing the plunger 37 in response to detection of the nonrecorded zone between each recorded zones. In FIG. 4, similar numerals are used to illustrate like parts in FIGS. 1 and 3. The output of the magnetic head 17 is applied through an output terminal 17*a* to a preamplifier (not shown) in a reproducing circuit (not shown) of the player and to a rectifying circuit 69. The rectifying circuit 69 as not shown consists of a diode, a capacitor, and a resistor and rectifies, averages the output signal from the magnetic head 17. The output of the rectifying circuit 69 is applied to a detecting circuit 70 composed of, for instance, a Schmidt circuit. If there is the output voltage from the rectifying circuit 69 in the detecting circuit, the output voltage is not produced at the output side of the detecting circuit but the latter is adapted to produce the output voltage at the output side when the output from the rectifying circuit 69 does not exist for a predetermined short period of time. In other words, where the magnetic head 17 is opposed to the recorded zone of the tape 19 the output voltage of the detecting circuit 70 is 0 whereas when the magnetic head 17 is opposed to the nonrecorded zone on the tape 19 the detecting circuit 70 generates a prescribed voltage at the output side of the detecting circuit. The output of the detecting circuit 70 is applied by a capacitor 71 between the base electrode and collector electrode of a PNP-transistor 72. The collector electrode of the transistor 72 is connected by the switch 66 within the variable resistor 67 to the magnetic pole of an electric source 73. On the other hand, the emitter electrode of the transistor 72 is connected by the plunger 37 with the positive pole of the source 73. If the output voltage is not produced from the detecting circuit 70, no emitter-to-base current of the transistor 72 exists, hence, the path from emitter to collector is open-circuited. Thus, the plunger 37 is not energized by the source 73. The output voltage is generated from the detecting circuit 70 and applied by the capacitor 71 to the base electrode of the transistor 72 whereby saturation full current flows from emitter to base, and the path from emitter to collector is short-circuited. At this time, when the switch 66 is closed, the plunger 37 is energized by the source 73.

Assuming that the cartridge 11 is located in the "play" position and the variable resistor 67 is operated to minimize the reproducing sound in the midst of playing a music composition or the like recorded in the magnetic tape 19, the switch 66 is closed. Upon closing the switch 66, the reproduction sound from the player is small whereas the tape 19 keeps its running. When the nonrecorded zone on the tape 19 is opposed to the magnetic head 17 to make the output signal from the magnetic head 17 substantially nil, the output voltage from the rectifying circuit 69 is 0 to allow the detecting circuit 70 to generate the output voltage by which the path from the emitter to collector is short-circuited and the electromagnetic plunger 37 is energized by the source 73. It may be understood that the cartridge 11 is shifted from the "play" position to the "nonplay" position in relation to energization of the plunger 37.

In accordance with the control circuit shown in FIG. 4, the cartridge 11 may be shifted from the "play" position to the "-nonplay" position in relation to detection of the nonrecorded zone on the tape 19 so that when once again the cartridge 11 is played, reproduction is initiated from the starting position of the recorded zone on the tape 11. As shown in FIG. 1, provided on the deck 10 is a slide switch 74 having a first element corresponding to the switch 66, and a second element for controlling the output of the reproducing circuit of the player. The slide switch 74 is not entirely required when the switch 66 is built in the variable resistor 67. When the cartridge 11 is located in the "play" position and a knob 75 of the slide switch 74 is manually slid in the rightward direction, the first element and second element are respectively closed. If the first element in place of the switch 66 is provided within the control circuit in FIG. 4, when the nonrecorded zone on the tape 19 is opposed to the magnetic head 17 the plunger 37 is energized and the cartridge 11 is shifted to the "nonplay" position by the tape cartridge shifting apparatus. The second element is provided in the reproducing circuit so as to break the reproducing output of the player by closing the second element. An actuator rod 76 is connected to the knob 75 and extends to a position shown by the dot and dash line when the knob 75 is manually slid in the rightward direction. When the arm lever 41 is returned from the position shown by the dot and dash line to the position indicated by the solid line, the actuator rod 76 is depressed by the arm lever 41 and returned to the position shown by the solid line. Accordingly, the first and second contacts are opened.

Figure 5:
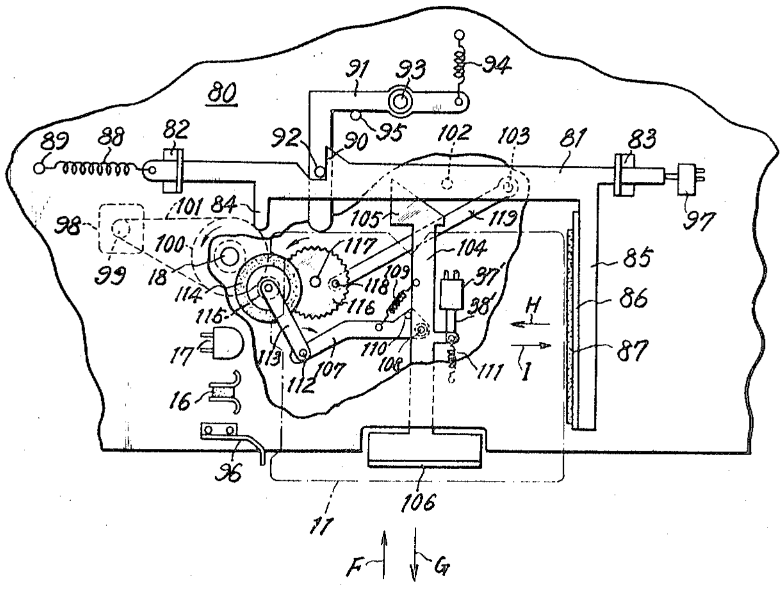
FIG. 5 is a schematic view of another embodiment of the tape cartridge shifting apparatus according to the invention.

FIG. 5 shows another embodiment of the tape cartridge shifting apparatus according to the present invention, wherein similar numerals are used to designate like parts in FIG. 1.

In the player shown in FIG. 1, the tape cartridge is longitudinally inserted in the player housing whereas in the player shown in FIG. 5 the cartridge is transversely inserted in the player housing. A reciprocating lever member 81 is slidably supported by guides 82, 83 fixed to a deck 80 within the player housing (not shown). The lever member 81 is provided for moving the cartridge 11 which is inserted in the housing from the direction of arrow F and is laid on the deck 80 toward the "play" position where the pinch roller 21 (FIG. 1) in the cartridge abuts against the capstan 18. The lever member 81 is provided adjacent its opposite ends with a relatively shorter arm or first arm 84 and a relatively longer arm or second arm 85 which projects from the lever member normal to its slide direction. A pushing member 87 of rubber sheet or the like adheres to a laterally extending flange 86 to engage the rear edge of the cartridge 11.

A comparatively heavy tension spring 88 is provided to extend between one end portion of the lever member 81 and a pin 89 mounted on the deck 80 to normally urge the lever member leftward. The lever member 81 when the cartridge 11 is not inserted or assumes the position shown in FIG. 5 is retained in a first position shown in FIG. 5 since latch pin 92 on a substantially L-shaped stopper lever 91 pivoted by a shaft 93 on the deck 80 engage hook stepped portion 90 formed in the lever member 81. The stopper lever 91 is biased in the counterclockwise direction by a spring 94 but inward movement of the stopper lever is limited by a stopper pin 95 on the deck 80. The one end of the topper pin 91 passes through the clearance between the lever member 81 and the deck 80 and extends in the direction of the opening (not shown) in the player housing.

The cartridge 11 may be located in the "play" position in the following manner. The cartridge 11 which has been manually inserted in the direction of arrow F to the position shown in FIG. 5 is further pressedly inserted. As a result, the stopper lever 91 is depressed by the edge of the cartridge 11 and thus clockwise rotated against the elastic force of the spring 94. When the cartridge 11 is inserted to the extent that the side edge thereof is close to the lever member 81, the pin 92 is released from the hook portion 90 whereby the lever member 81 is moved from the first position to the leftward direction by the elastic force of the tension spring 88. Leftward movement of the lever member 81 urges the pushing member 87 against the rear edge of the cartridge 11 to move the cartridge along with a guide member 96 on the deck 80 in the direction of arrow H. The pinch roller 21 (FIG. 1) in the cartridge 11 abuts against the capstan 18 to thereby limit movement of the lever member 81 and the cartridge by the tension spring 88 retaining the lever member in a second position. Where the lever member 81 is moved to the second position, the cartridge 11 causes abutment of the pinch roller 21 (FIG. 1) with the capstan 18 in aid of the elastic force of the tension spring 88 while a relative position as to the capstan 18, magnetic head 17, end mark detector 16 is immovably maintained so that the cartridge is precisely disposed in the "play" position. The lever member 81 is away from the first position whereby an electric switch 97 corresponding to the door switch 15 (FIG. 1) is closed to energize a motor 98 for rotatably drive the capstan 18. Accordingly, the cartridge 11 in the "play" position is played in a manner that the tape 19 (FIG. 1) passes through the capstan 18, the pinch roller 21 (FIG. 1) and is drivingly transported with abutting against the magnetic head 17. Rotation of a shaft 99 by the motor 98 is imparted by a belt 101 trained between the shaft 99 and a flywheel 100 on the capstan 18 to the capstan 18.

Next, the tape cartridge shifting apparatus of the invention for shifting the cartridge 11 in the "play" position to the "nonplay" position will be detailed hereinafter.

Pins 102 and 103 are mounted on the lever member 81 thereunder and pass through slots (not shown) on the deck 80 to project therefrom. A push lever 104 is slidably mounted by guide (not shown) on the deck 80 thereunder. The push lever 104 includes at one end thereof a triangular hook portion 105 and at the other end a substantially rectangular pushing portion 106 which is integrally formed with the lever and upwardly extends therefrom. The pushing portion 106 is opposed to an opening (not shown) formed in a front panel (not shown) of the player housing so as to enable the pushing portion to be depressed by hand. An arm 107 is pivoted at a point 108 under the lever 104. The arm 107 is biased in the clockwise direction by a comparatively heavy spring 109 but inward movement of the arm is limited by a stopper pin 110. Connected to the arm 107 at one end thereof is an actuator 38′ of the plunger 37′ corresponding to the plunger 37 (FIGS. 1, 3, and 4). A comparatively weak spring 111 of which one end is secured beneath of the deck 80 is also connected at the other end thereof to the arm 107. The push lever 104 is normally biased by the elastic force of the spring 111 to the position as shown. An arm 113 is pivoted at a point 112 to the arm 107 at the other end thereof. Mounted on the arm 113 at the tip end thereof are an idler wheel 114 and a gear 115 connected with each other. The arm 113 is biased in the direction of the arrow by a spring (not shown). The idler wheel 114 is normally disposed adjacent the capstan 18 and rotatably driven by abutting against the capstan 18 in relation to energization of the plunger 37′ as will be later described. A gear 116 is rotatably mounted on an axis 117 beneath the deck 80 to mesh with the gear 115. A crank rod 119 is pivotally mounted at its opposite ends on a pin 118 off the center of the gear 116 and the pin 103 on the lever member 81. The lever member 81 and the gear 116 are connected by this crank rod with each other.

It will be understood that when the cartridge 11 is located in the "play" position and the lever member 81 is in the second position, the gear 116 assumes a position where it makes rotation of about 180° from the position as shown. Now, the plunger 37′ is energized, the push lever 104, arm 107, and the arm 113 are bodily moved against the elastic force of the spring 111 to allow the idler wheel 114 to abut against the capstan whereby the gear 115 meshes with the gear 116. At this time, the idler wheel 114 is intended to be drawn in the direction urgedly abutting against the capstan 18 since the capstan is rotated in the direction of the arrow as shown. Therefore, abutment between the capstan 18 and the idler wheel 114 is maintained even after the plunger 37′ has been energized thereby rotating the idler wheel 114. Rotation of the idler wheel 114 is decelerated and transmitted through the gear 115 to the gear 116 to rotate the gear 116 in the direction of the arrow as shown. With rotation of the gear 116, the lever member 81 is moved from the second position by the crank rod 119 against the elastic force of the tension spring 88 and approximately half rotated whereat the lever member 81 is then returned to the first position and engages with the stopper lever 91. In return of the lever member 81 from the second position to the first position, the front edge of the cartridge 11 is pushed by the first arm 84 to shift the cartridge 11 from the "play" position to the direction of arrow I. And, the cartridge 11 is urged in the direction of arrow G by the stopper lever 91 which is returned by the bias of the spring 94 to its original position when the lever member 81 is returned to the first position. In association with opening of the switch 97 which is actuated by the lever member 81 returned to the first position, the motor 98 is deenergized to block rotation of the capstan 18. As the capstan 18 stops its rotation, the idler wheel 114 which has been intended to be drawn in the direction abutting against the capstan 18 is returned with the lever 104, arms 107 and 113 by the elastic force of the spring 111 to keep away from the capstan 18. As described above, the cartridge 11 is shifted from the "play" position to the "-nonplay" position with respect to the energization of the plunger 37′. When the plunger 37′ is energized by a control circuit similar to the control circuit in FIG. 3 in association with detection of the end mark 68 on the tape 19, in the next play of the cartridge 11 which has been shifted to the "nonplay" position, the tape 19 is caused to be reproduced from the starting position thereof. This is also the case with the following. It will be obvious that when the plunger 37′ is energized by a control circuit similar to that in FIG. 4, in the next play of the cartridge which has been shifted to the "nonplay" position, the tape 19 is allowed to be reproduced from the beginning of the recorded zone on the tape 19.

Mode of operation of the cartridge by which the cartridge 11 is returned from the "play" position to the "nonplay" position will be described hereinafter. It forms no part of the present invention to allow the cartridge to manually be shifted from the "play" position to the "nonplay" position. When the lever member 81 is moved to the second position, the pin 103 is closed to and positioned at an inclined portion of the hook portion 105 of the lever 104. In retraction of the cartridge 11 from the "play" position, the pushing portion 106 is depressed against the bias of the spring 111 to abut the inclined portion against the pin 103 on the lever member 81 whereby the latter is moved from the second position against the bias of the spring 88. At a point where the lever member 81 is returned to the first position, depression upon the pushing portion 106 is released to cause the lever 104 to be returned to the original position by the bias of the spring 111 while the lever member 81 is retained by the stopper lever 91.

In fact, the gear 116 does not make more than half rotation, it is not required to provide teeth in the whole periphery of the gear. That is, it is enough to form teeth in the gear 116 on the half periphery thereof meshing with the gear 116.

The invention and its attendant advantages will be understood from the foregoing description. It is to be understood that change and variations may be made without departing from the spirit and scope of the invention as defined in the appended claim.

What is claimed is:

1. A tape cartridge shifting apparatus for an endless magnetic tape cartridge player, said tape player having a tape cartridge positioning mechanism for locating the tape cartridge in the playing position, and a housing provided with tape driving means including a rotary capstan for drivingly feeding an endless magnetic tape in the cartridge and a tape reproducing circuit including a magnetic head, comprising: a deck provided in said housing and carrying said tape cartridge positioning mechanism, said capstan, and said magnetic head; lever means movably provided on said deck and having a portion engageable with the front edge of said tape cartridge located in the playing position by said tape cartridge positioning mechanism; lever driving means for moving said lever means, said tape cartridge being shifted by said lever driving means when said lever means is moved; an electromagnetic device for actuating operation of said driving means; a variable resistor in said tape reproducing circuit for adjusting the volume of the output of said player; and a control circuit for said electromagnetic device, said control circuit including in series connection, said electromagnetic device, an electrical source to power said electromagnetic device, a normally open electrical switch, and a pair of electrically insulated electrical contacts arranged to be shorted by an end mark of conductive foil on said tape, said electrical switch and said variable resistor being operably connected to close said switch when the variable resistor is adjusted to provide minimum volume, whereby, when said switch is closed and the end mark passes between said contacts, said electromagnetic device is energized and actuated by said source and thereby move the tape cartridge from the playing position to the nonplaying position.

2. A tape cartridge shifting apparatus for an endless magnetic tape cartridge player in accordance with claim 1, wherein said lever driving means comprises a swing lever rotatably mounted on said deck, a frictional wheel rotatably mounted on said swing lever, a cam rotatably provided on said swing lever, a speed reducing device mounted between said frictional wheel and said cam for rotating said cam by rotational force of said capstan, a spring biasing said switch lever to a normal position, said swing lever being operably connected to said electromagnetic device in such a manner that said swing lever is rotated against the bias of said spring to a position where said frictional wheel abuts against said capstan when said electromagnetic device is energized retention means for releasably retaining the swing lever in said second position and a pin provided on said lever means to abut against said cam, said cam and said pin being so arranged that rotation of said cam results in movement of said lever means through said pin to shift said tape cartridge from the playing position to the nonplaying position.

3. A tape cartridge shifting apparatus for an endless magnetic tape cartridge player in accordance with claim 1, wherein said lever driving means comprises an idler wheel rotatably pivoted to an arm lever swingably mounted on said deck, a rotary member rotatably mounted on said deck, a transmission device for imparting rotation of said idler wheel to said rotary member, and a crank rod connecting a point away from the center position of rotation of said rotary member to one point on said lever means, said arm lever being adapted to be swung to a position where said idler wheel abuts against said capstan when said electromagnetic device is energized, whereby when said rotary member is rotated by rotational force of said capstan through said idler wheel and said transmission device, said lever means is moved through said crank rod with rotation of said rotary member and said tape cartridge is shifted from the player position to the nonplaying position.

4. A tape cartridge shifting apparatus for an endless magnetic tape cartridge player in accordance with claim 1, wherein said electrical switch is provided on said deck and having a knob for manual operation and an actuator rod connected to said knob, said electrical switch being adapted to be closed by manually operating said knob while said actuator rod is pushed and to be returned to its normal open position by said lever means being moved by said lever driving means.

5. A tape cartridge shifting apparatus for an endless magnetic tape cartridge player, said tape player having a tape cartridge positioning mechanism for locating the tape cartridge in the playing position, and a housing provided with tape driving means including a rotary capstan for drivingly feeding an endless magnetic tape in the cartridge and a tape reproducing circuit including a magnetic head, comprising: a deck provided in said housing and carrying said tape cartridge positioning mechanism, said capstan, and said magnetic head; lever means movably provided on said deck and having a portion engageable with the front edge of said tape cartridge located in the playing position by said tape cartridge positioning mechanism; lever driving means for moving said lever means, said tape cartridge being shifted by said lever driving means when said lever means is moved; an electromagnetic device for actuating operation of said driving means; a variable resistor in said tape reproducing circuit for adjusting the volume of the output of said player; and a control circuit for said electromagnetic device, said control circuit including a normally open electrical switch detecting means for detecting that a nonrecorded zone between the recorded zones on the tape is at said magnetic head and for generating an output signal, said detecting means including a transistor whose emitter electrode and collector electrode are short-circuited by applying the output of said detecting means to the base electrode of said transistor and an electrical source for energizing said electromagnetic device, said electrical switch, said emitter electrode, said collector electrode, and said source being in series connection with said electromagnetic device, said electrical switch and said variable resistor being operably connected to close said switch when the variable resistor is adjusted to provide minimum volume, wherein when said nonrecorded zone on said tape is at said magnetic head, said electromagnetic device is actuated to move said lever means through said lever driving means and thereby shift said tape cartridge from the playing position to the nonplaying position.

* * * * *